United States Patent
Soulhi et al.

(10) Patent No.: US 12,205,351 B2
(45) Date of Patent: Jan. 21, 2025

(54) SYSTEMS AND METHODS FOR EXPLANATION OF MODELS USING IMAGE ANALYSIS TECHNIQUES

(71) Applicant: Verizon Patent and Licensing Inc., Basking Ridge, NJ (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 435 days.

(21) Appl. No.: 17/804,865

(22) Filed: Jun. 1, 2022

(65) Prior Publication Data

US 2023/0394799 A1    Dec. 7, 2023

(51) Int. Cl.
| | | |
|---|---|---|
| G06K 9/00 | (2022.01) |
| G06N 20/20 | (2019.01) |
| G06V 10/74 | (2022.01) |
| G06V 10/75 | (2022.01) |
| G06V 10/774 | (2022.01) |

(52) U.S. Cl.
CPC ........... *G06V 10/774* (2022.01); *G06N 20/20* (2019.01); *G06V 10/751* (2022.01); *G06V 10/761* (2022.01)

(58) Field of Classification Search
CPC .... G06V 10/88; G06V 10/751; G06V 10/761; G06V 10/774; G06V 10/776; G06V 10/40; G06V 10/46; G06V 10/74; G06V 10/764; G06N 20/20; G06N 3/09; G06N 5/045
See application file for complete search history.

(56) References Cited

U.S. PATENT DOCUMENTS

| | | | |
|---|---|---|---|
| 2020/0265238 A1* | 8/2020 | Polavarapu | G06V 20/20 |
| 2020/0312037 A1* | 10/2020 | Kopeinigg | G06T 7/70 |
| 2022/0067967 A1* | 3/2022 | Luo | G06V 40/168 |
| 2023/0196131 A1* | 6/2023 | Singla | H04W 16/22 |
| | | | 706/12 |

OTHER PUBLICATIONS

Spinner, Thilo, et al. "explAIner: A visual analytics framework for interactive and explainable machine learning." IEEE transactions on visualization and computer graphics 26.1 (2019): 1064-1074. (Year: 2019).*

* cited by examiner

*Primary Examiner* — Avinash Yentrapati (57) ABSTRACT

A system described herein may train an explanation model based on a set of images and a set of explanation labels. The system may receive input data, and may provide the input data to the explanation model and a second model. The second model may provide a set of output labels, which may include performing unknown or "black box" processing on the input data. The explanation model may generate one or more images based on the input data, compare the images to the set of images based on which the explanation model was trained, and accordingly identify one or more explanation labels with bounding boxes associated with the generated one or more images. The system may output, in response to the input data, the set of output labels provided by the second model as well as the identified explanation labels.

20 Claims, 10 Drawing Sheets

SYSTEMS AND METHODS FOR EXPLANATION OF MODELS USING IMAGE ANALYSIS TECHNIQUES

BACKGROUND

Models, such as predictive models, statistical models, artificial intelligence/machine learning ("AI/ML") models, etc. may be used to provide labels, predictions, categories, and/or other types of outputs based on one or more input values. The rationale, reasoning, algorithms, etc. used by such models may not necessarily be available to entities that make use of such models, which may add uncertainty as to the reliability or usefulness of the outputs of such models.

DETAILED DESCRIPTION OF EXAMPLE EMBODIMENTS

The following detailed description refers to the accompanying drawings. The same reference numbers in different drawings may identify the same or similar elements.

Models may be used to generate outputs, such as labels, categories, predictions, etc. based on input values, which may include Key Performance Indicators ("KPIs") of a wireless network, sensor readings associated with an autonomous vehicle, historical location information of one or more mobile devices, and/or other suitable values. The processing performed by models on input values in order to generate output values may be widely varied, and particular algorithms, weights, modeling techs, and/or other attributes of models may not always be ascertainable. Thus, such models may not necessarily be explainable, and it may be difficult for an entity using such models to gauge how accurate, reliable, etc. such models are.

As discussed below, embodiments described herein may generate and/or utilize an explanation model in conjunction with another model, in order to provide explanations, annotations, etc. associated with outputs generated by the model based on a given set of input values. The output of the explanation model may therefore describe and/or provide insight as to reasoning, rationale, algorithms, weights, and/or other parameters utilized by the model in order to generate the set of outputs. In this manner, the model may become explainable, and the outputs of the model may be handled, processed, weighted, etc. based on the explanations of the model determined in accordance with some embodiments.

Figure 1:
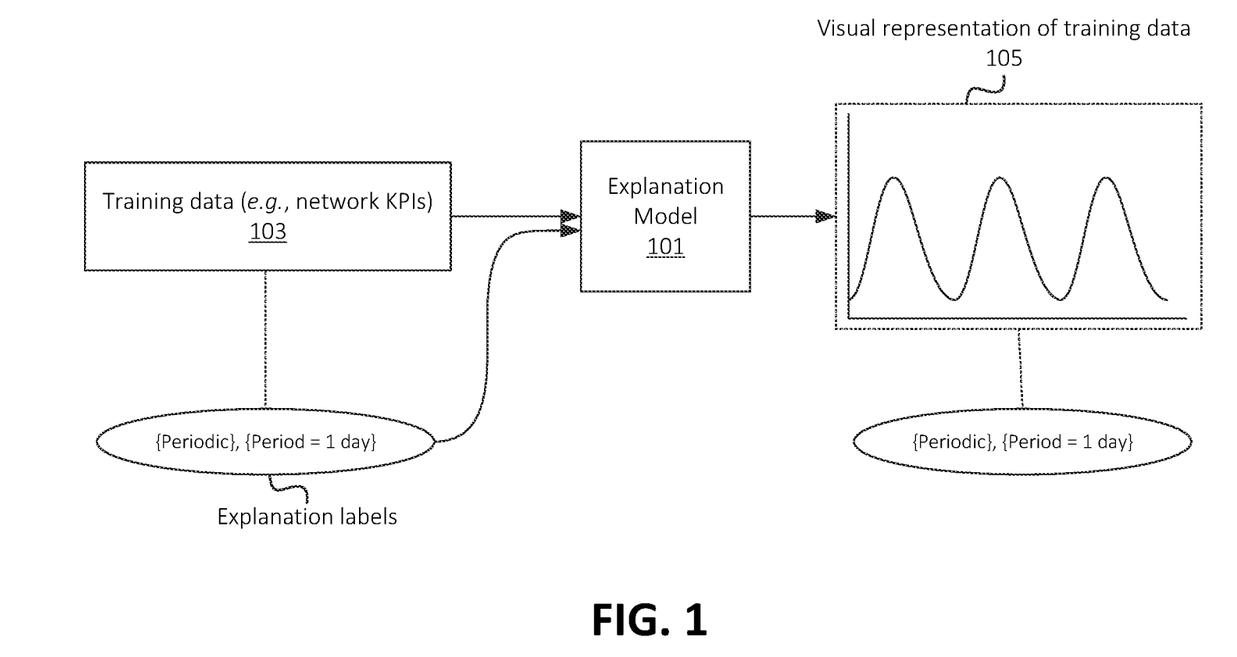
FIG. 1 illustrates an example training process for an explanation model, in accordance with some embodiments.

As shown in FIG. 1, for example, explanation model 101 may be trained to associate a set of training data 103 with a set of labels (referred to as "explanation labels"). Training data 103 may include, for example, a set of network KPIs, such as a time series of network KPIs (e.g., KPI values measured over a duration of time, such as one minute, one hour, one day, one year, etc.). The KPIs may include Quality of Service ("QoS") and/or performance-related KPIs, such as latency, throughput, jitter, etc. Additionally, or alternatively, the KPIs may include load-related KPIs, such as quantity of connected User Equipment ("UEs") at one or more base stations, amount of used and/or available radio frequency ("RF") resources (e.g., Physical Resource Blocks ("PRBs")) at one or more base stations, etc. In some embodiments, the KPIs may include one or more other types of KPIs associated with a wireless network.

In some embodiments, training data 103 may include values in addition to, or in lieu of, KPIs of a network. For example, as discussed above, training data 103 may include sensor readings, such as sensor readings measured by an autonomous vehicle, an Internet of Things ("IoT") device, etc. As another example, training data 103 may include some other type of data that is representable as a graphical or visual representation (e.g., as a graph, plot, chart, etc.).

In some embodiments, training data 103 may be obtained via real-world measurements, observations, etc. (e.g., based on the operation of one or more live systems from which some or all values of training data 103 are obtained, measured, etc.). Additionally, or alternatively, training data 103 may be, or may include, values obtained via one or more simulations. Training data 103 and the associated explanation labels may be "ground truth" data, in that the explanation labels provided to explanation model 101 in conjunction with training data 103 may be the "desired" or "correct" output for data (e.g., at "run-time") that matches (e.g., within a threshold measure of similarity, using a suitable similarity analysis) training data 103.

Explanation model 101 may, in accordance with some embodiments, generate one or more visual representations 105 of training data 103. For example, explanation model 101 may generate one or more graphs, charts, plots, etc. based on training data 103. In situations where training data 103 includes multiple instances, trials, etc. of data, a particular visual representation 105 may be generated based on a combination of the multiple instances, trials, etc. of training data 103.

In this example, the explanation labels may include "Periodic" and "Period=1 day." For example, the explanation labels may indicate that values of the KPIs indicated in training data 103 may vary or cycle periodically, where the period occurs on a daily basis. In some embodiments, explanation labels may include any suitable descriptor, attribute, mathematical function, trend (e.g., upward or downward trends), non-linear tendency, non-linearity degree, turning points, etc. associated with training data 103. Such descriptors, attributes, etc. may include a coefficient, exponent, degree of severity, etc. of a particular curve, mathematical function, etc. For example, a non-linear function, curve, exponential function, etc. may have varying degrees of severity, exponentially, etc. that may not necessarily be readily ascertainable to the human eye. The explanation labels may accordingly include indications of the degree of severity, exponentially, etc. (e.g., "third order polynomial," "fifth order polynomial," etc.). As a result of training explanation model 101 (e.g., based on training data 103 and the associated explanation labels), explanation model 101 may associate one or more visual representations of training data 103 (e.g., visual representation 105) with the explanation labels.

Figure 2:
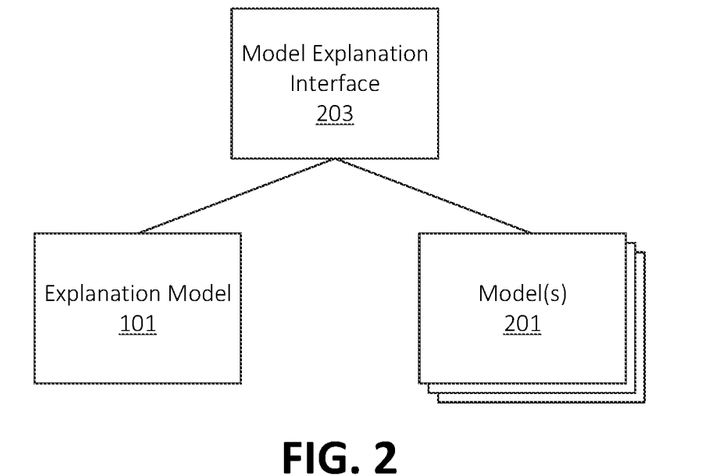
FIG. 2 illustrates an example arrangement of a model explanation interface, explanation model, and one or more models, in accordance with some embodiments.
Figure 3:
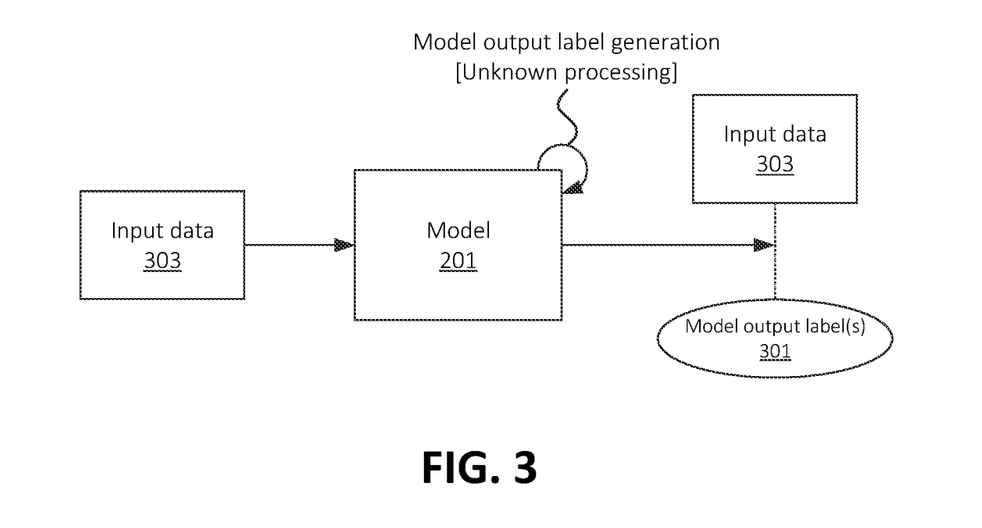
FIG. 3 illustrates an example of an association between input data and one or more model output labels that may be generated by a model, in accordance with some embodiments.

In some embodiments, as shown in FIG. 2, explanation model 101 (e.g., which may be trained in a manner similarly discussed above), may be used in conjunction with one or more models 201 in order to provide explanations (e.g., explanation labels) for model output labels provided by such models 201. For example, model explanation interface 203 may be communicatively coupled to (e.g., via one or more application programming interfaces ("APIs") or other suitable communication pathways) explanation model 101 and one or more models 201. As noted above, as shown in FIG. 3, models 201 may utilize unknown processing, weights, algorithms, etc. to generate a respective set of outputs (e.g., model output labels 301) based on a set of input data 303. For example, models 201 may have been developed, generated, provided, etc. by an entity other than an entity utilizing models 201 to generate model output labels 301. In this manner, the algorithms, modeling techniques, weights, etc. based on which models 201 generate model output labels 301 may be unknown or unexplainable, in the absence of techniques described herein in accordance with some embodiments.

Figure 4:
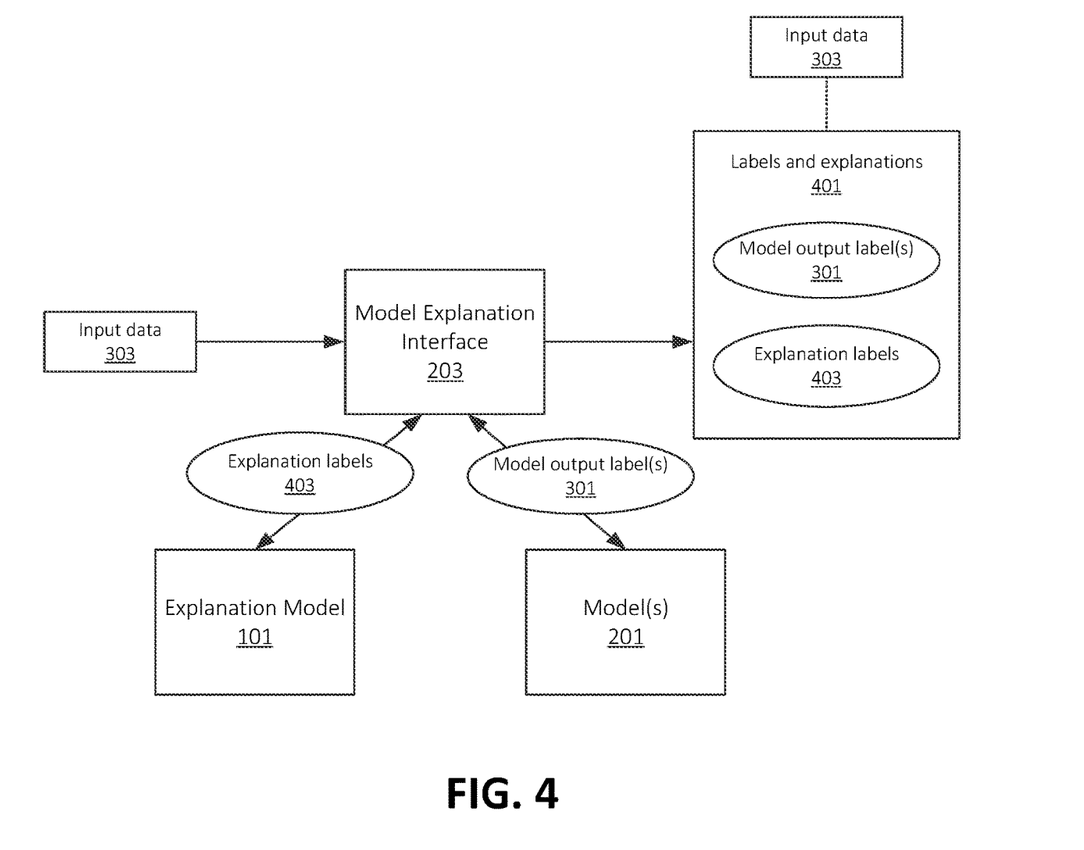
FIG. 4 illustrates an example association between input data, model output labels, and explanation labels that may be provided in response to the input data, in accordance with some embodiments.

Model explanation interface 203 may accordingly, as shown in FIG. 4, provide the same input data 303 as input to both explanation model 101 and one or more models 201, in order to generate a set of labels and explanations 401. For example, explanation model 101 may generate a set of explanation labels 403 based on input data 303 (e.g., may generate one or more visual representations of input data 303, compare the generated visual representations to previously generated visual representations/images generated based on training data, and identify explanation labels 403 based on the comparison), and model(s) 201 may generate a set of model output labels 301 based on input data 303. Model explanation interface 203 may generate a package, bundle, etc. of model output labels 301 and explanation labels 403, such that labels and explanations 401 may indicate which particular models 201 were used, the respective outputs (e.g., model output labels 301) of such models 201, as well as explanations (e.g., explanation labels 403) which may indicate how or why model output labels 301 were generated. In this manner, a user or other entity providing input data 303 may receive classifications, labels, etc. generated by one or more models 201 (e.g., model output labels 301) as well as explanations (e.g., explanation labels 403) for the outputs of the one or more models 201.

Figure 5:
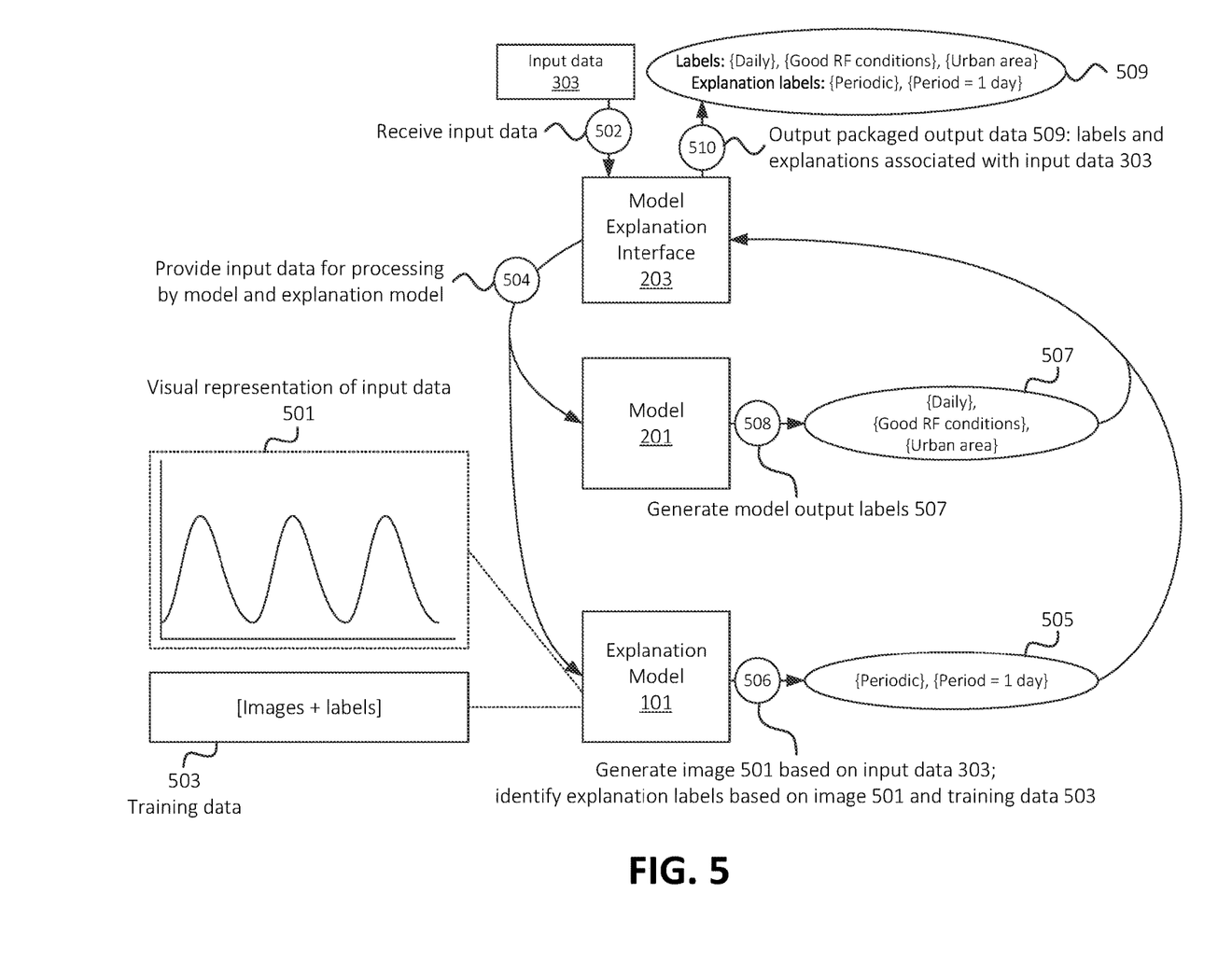
FIG. 5 illustrates an example of generating and outputting packaged output data that includes an association between input data, model output labels, and explanation labels, in accordance with some embodiments.

FIG. 5 illustrates a specific example of the concepts shown in FIG. 4. As shown in FIG. 5, for example, model explanation interface 203 may receive (at 502) a set of input data 303. In some embodiments, input data 303 may be provided in conjunction with an identifier of one or more models 201 that should be used to generate one or more model output labels. Input data 303 may include time-series values, network KPIs, sensor data, and/or other suitable input data. Model explanation interface 203 may provide (at 504) input data 303 as input to one or more models 201, and may further provide (at 504) input data 303 as input to explanation model 101. Explanation model 101 may also generate (at 506) visual representation 501 of input data 303, which may include one or more graphs, plots, charts, etc. In some embodiments, explanation model 101 may generate multiple different visual representations of the same input data 303, such as a graph and a chart, or as two graphs with different scales and/or axis values, etc. Explanation model 101 may also maintain a set of training data 503 which, as discussed above, may associate one or more images with one or more explanation labels (e.g., images that are visual representations of values provided to explanation model 101 during a training process).

Explanation model 101 may further identify (at 506) one or more explanation labels 505 by comparing the one or more visual representations 501 of input data 303 to the images associated with training data 503. For example, explanation model 101 may perform a computer vision analysis and/or may utilize other image recognition techniques in order to identify a measure of similarity between visual representation 501 and images associated with training data 503. For example, explanation model 101 may identify one or more images, of training data 503, that are the most similar to visual representation 501 and/or that exhibit a measure of similarity to visual representation 501 that exceeds a threshold measure of similarity. Explanation model 101 may further identify particular explanation labels 505 that are indicated by training data 503 as associated with the identified one or more images.

Model 201 may further generate (at 508) a set of model output labels 507 based on input data 303. As discussed above, model 201 may utilize unknown, or "black box," processing, deep learning neural networks, weights, deep learning techniques, or other techniques without apparent explainability in order to generate model output labels 507 (e.g., "Daily," "Good RF conditions," and "Urban area," in this example). Model explanation interface 203 may receive explanation labels 505 and model output labels 507, and may output (at 510) packaged output data 509, which may include model output labels 507 and explanation labels 505. For example, in this example, model output labels 507 (e.g., "Daily," "Good RF conditions," and "Urban area) may be provided with the explanation labels 505 (e.g., "Periodic" and "Period=1 day"). In this manner, a user or other entity analyzing the output of model 201 may be able to easily ascertain that model output labels 507 may have been determined, at least in part, based on explanations such as "Periodic" and/or "Period=1 day." In other examples, other suitable time-series patterns or descriptors may be used as explanation labels 505 associated with model output labels 507.

In some embodiments, packaged output data 509 may include visual explanation information, which may indicate why certain explanation labels 505 apply to input data 303. For example, packaged output data 509 may include some or all of visual representation 501 of input data 303. In some embodiments, packaged output data 509 may include annotations, bounding boxes, etc. overlaid on portions of visual representation 501. Such annotations, bounding boxes, etc. may be used to visually highlight, emphasize, etc. features, attributes, patterns, etc. of visual representation 501 that were identified by explanation model 101 as being similar, matching, and/or otherwise being associated with images included in training data 503. In this manner, an entity receiving, viewing, etc. packaged output data 509 may be able to readily identify times at which particular explanation labels 505 are particularly relevant. Further, such information may be able to be used in correlation with external data to identify events, conditions, triggers, configuration parameters, etc. based on which particular explanation labels 505 were identified. In situations where explanation labels 505 are associated with anomalous or undesirable events, conditions, etc., remedial action may be taken in order to rectify or remediate such events, conditions, etc.

Figure 6:
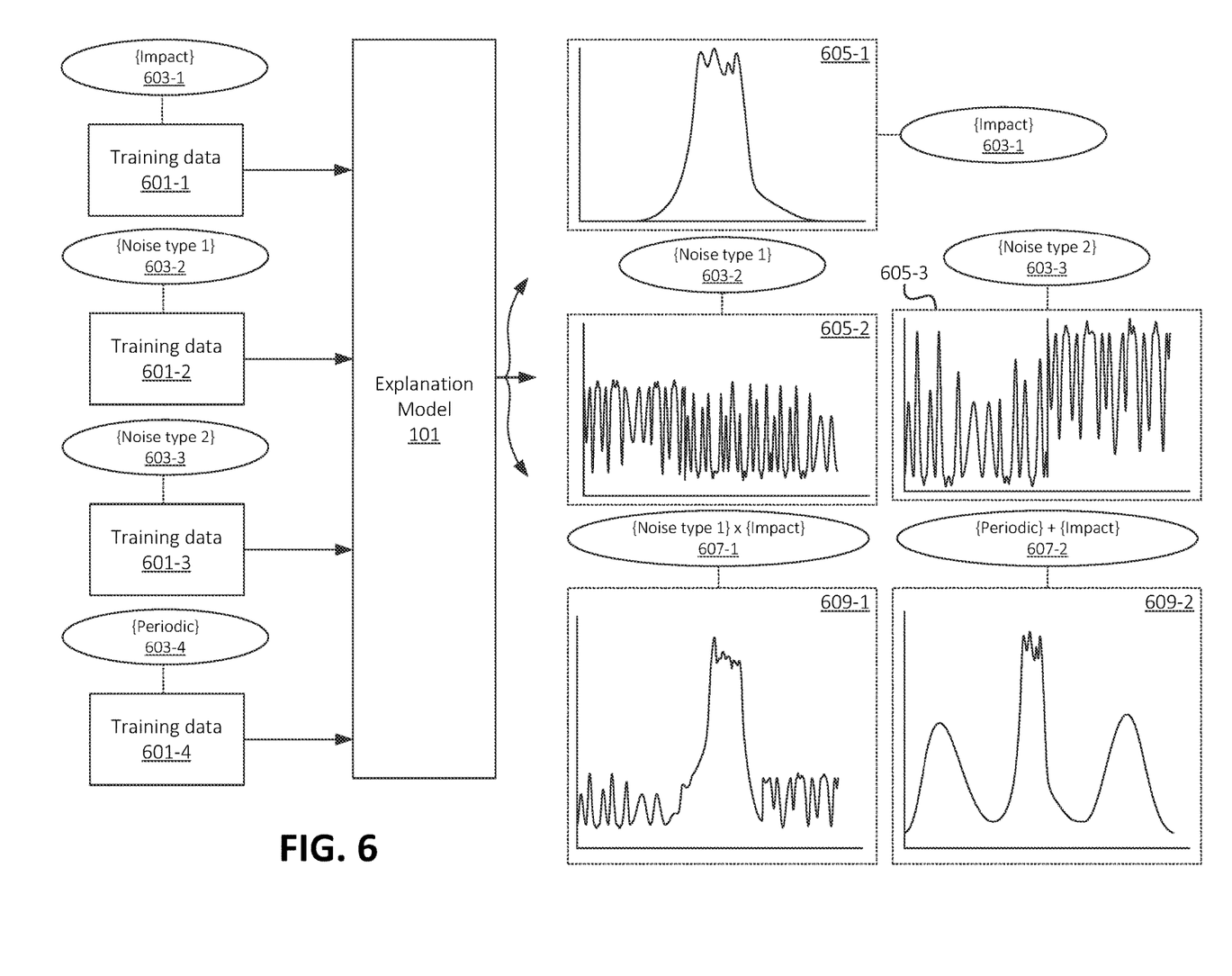
FIGS. 6 and 7 illustrate examples of composite explanation labels that may be generated in accordance with some embodiments.

In some embodiments, the training of explanation model 101 may include combining different training data values to generate composite explanation labels that are based on multiple sets of training data and associated explanation labels. For example, as shown in FIG. 6, explanation model 101 may receive (e.g., as part of a training process) multiple sets of training data values 601 (e.g., sets of values 601-1 through 601-4) along with respective associated explanation labels 603. For example, a first set of training data values 601-1 may be associated with a first explanation label 603-1, a second set of training data values 601-2 may be associated with a second explanation label 603-2, a third set of training data values 601-3 may be associated with a third explanation label 603-3, and a fourth set of training data values 601-4 may be associated with a fourth explanation label 603-4.

Explanation model 101 may generate visual representations 605 based on each set of training data values 601, and may associate such visual representations 605 with the provided explanation labels 603. For example, explanation model 101 may associate visual representation 605-1 with explanation label 603-1, visual representation 605-2 with explanation label 603-2, visual representation 605-3 with explanation label 603-3, and so on. Explanation model 101 may also combine different sets of training data values 601 and may generate visual representations 609 based on combined sets of training data values 601. Further, explanation model 101 may associate composite explanation labels 607 with respective visual representations 609.

For example, visual representation 609-1 may be generated based on combining training data values 601-2 with training data values 601-1, and visual representation 609-2 may be generated based on combining training data values 601-1 with training data associated with a "periodic" explanation label. Combining training data to generate composite visual representations 609 may be performed using additive operations, multiplicative operations, and/or other suitable operations based on which sets of data may be combined. Composite explanation labels 607 may accordingly indicate the types of operations used to combine associated visual representations 609. For example, composite explanation label 607-1 may indicate that visual representation 609-1 is associated with a multiplicative combination of training data values 601-1 and training data values 601-2, while composite explanation label 607-2 may indicate that visual representation 609-2 is associated with an additive combination of training data values 601-1 and training data associated with a periodic explanation label.

Figure 7:
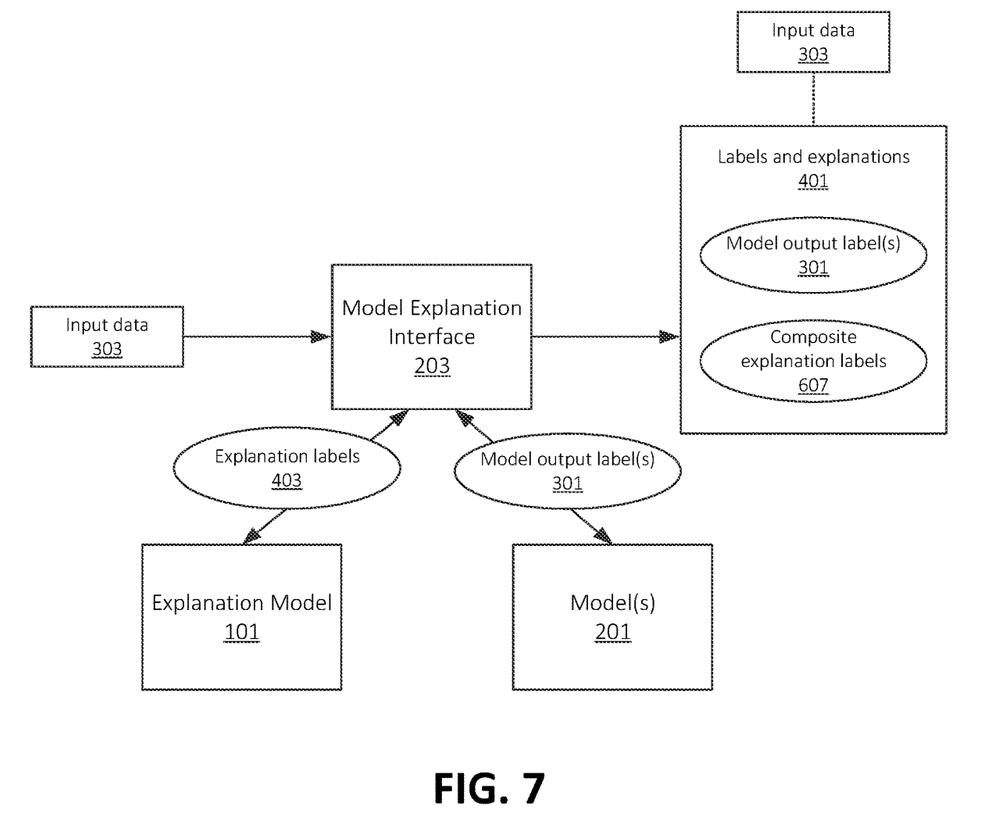

In some embodiments, other types of combinations may be used, and visual representations 609 (along with associated composite explanation labels 607) may be generated based on more than two sets of training data values 601. Further, while certain examples of training data and/or labels (e.g., impact, periodic, noise) are shown here, in practice, other types of labels may be used. Accordingly, as shown in FIG. 7, the labels and explanations 401 generated by model explanation interface 203, based on a set of input data 303, may further include composite explanation labels 607. Such composite explanation labels 607 may include or represent, for example, sets of data (e.g., network KPIs or other suitable data) scrambled with different noise types according to one or more colored noise models, in one embodiment along with multiple spectral profiles, such as white noise (e.g., zero mean, constant variance, and uncorrelated in time), red (or Brownian) noise (e.g., zero mean, constant variance, and serially correlated in time), and/or other suitable types of noise. In this manner, the explanations provided by model explanation interface 203 along with model output labels 301 may further be more robust and detailed.

In some embodiments, certain types or instances of training data 601 may be indicated, tagged, flagged, etc., such that visual representations 605 of such instances or types of training data 601 are not used, by themselves, by explanation model 101 when identifying explanation labels 403 associated with a set of input data 303. For example, training data 601-2 and 601-3 (e.g., associated with types of noise) may be indicated (e.g., during a training process of explanation model 101) in this manner. As such, these types of training data 601-2 and 601-3 may be used to generate composite explanation labels 607 (e.g., in combination with other types of training data 601) as well as corresponding visual representations 609, and such visual representations 609 may be used by explanation model 101 when identifying explanation labels 403 associated with a set of input data 303. However, based on the indication, flag, etc. that training data 601-2 and 601-3 (e.g., types of noise) should not be individually used by explanation model 101 to identify explanation labels 403 associated with a set of input data 303, explanation model 101 may forgo comparing visual representation 501 of input data 303 to visual representations 605-2 and 605-3 when attempting to identify explanation labels 403 that are associated with input data 303. In this manner, the amount of processing time and/or resources used to identify explanation labels 403 associated with input data 303 may be reduced, as the amount of visual representations 605 of training data 601 against which to compare visual representation 501 of input data 303 may accordingly be reduced based on such indications, flags, etc.

Figure 8:
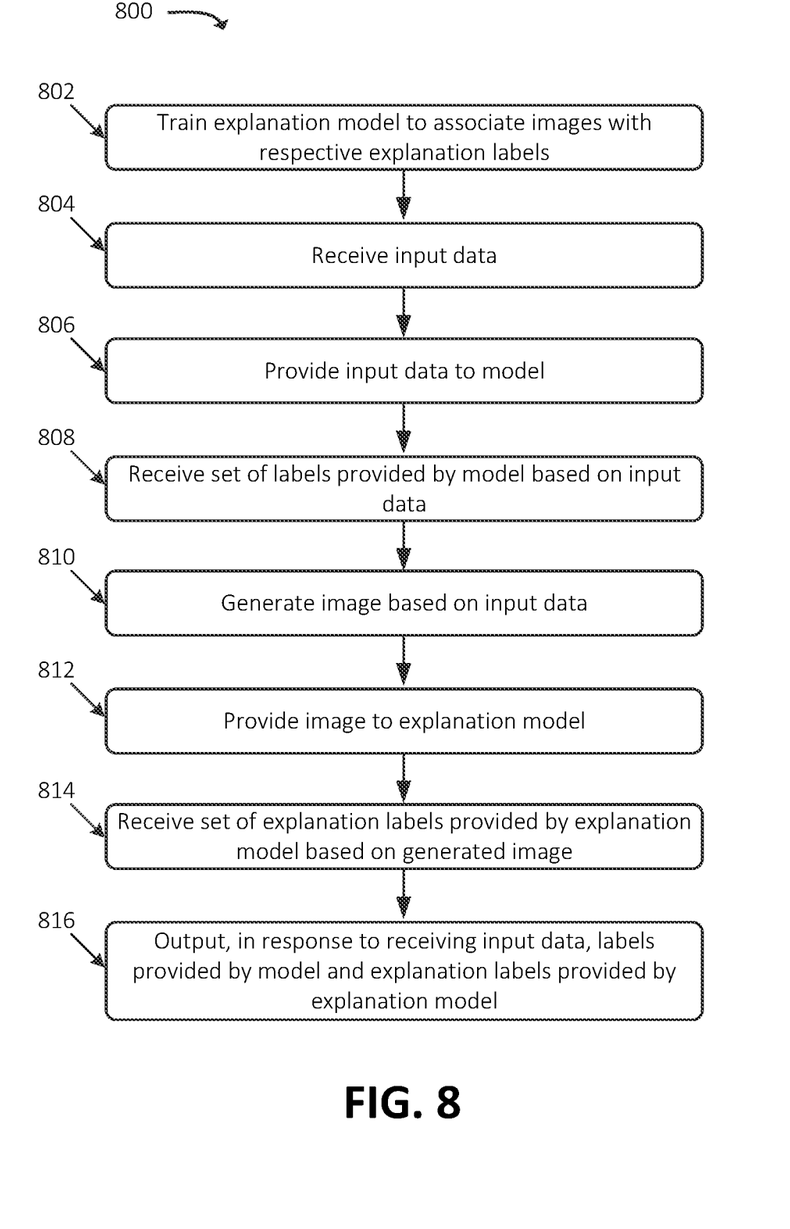
FIG. 8 illustrates an example process for providing explanation labels in conjunction with model output labels generated by a model using unknown processing and/or modeling techniques, in accordance with some embodiments.

FIG. 8 illustrates an example process 800 for providing explanation labels in conjunction with model output labels generated by a model using unknown processing and/or modeling techniques. In some embodiments, some or all of process 800 may be performed by model explanation interface 203. In some embodiments, one or more other devices may perform some or all of process 800 in concert with, and/or in lieu of, model explanation interface 203 (e.g., one or more devices that implement one or more explanation models 101 and/or models 201).

As shown, process 800 may include training (at 802) one or more models, such as explanation model 101, to associate one or more images with respective explanation labels. For example, as discussed above, explanation model 101 may, as part of a training process, receive and/or generate one or more visual representations 105 (e.g., images, charts, graphs, etc.) of data, such as time-series data or other data that may be suitably represented by one or more visual representations 105. In some embodiments, the data may include and/or may be based on network KPIs, sensor data, autonomous vehicle data, or other suitable types of data.

Process 800 may further include receiving (at 804) input data. For example, as discussed above, model explanation interface 203 may receive input data 303, which may include network KPIs, sensor data, etc. to be processed by one or more models 201. For example, a user or other entity may provide such input data 303 in order to receive model output labels 301 and/or other outputs of the one or more models 201. Input data 303 may be provided as, for example, a table, a set of raw values, etc. That is, in some embodiments, input data 303 may not be provided as an image or other type of visual representation. On the other hand, in some embodiments, input data 303 may include or may be provided as an image or some other suitable type of visual representation of data.

Process 800 may additionally include providing (at 806) the input data to one or more models. For example, as discussed above, model explanation interface 203 may provide, as input to one or more models 201, the received (at 804) input data. As discussed above, the one or more models 201 may perform unknown processing and/or may use unknown modeling techniques in order to generate one or more model output labels 301 associated with input data 303. In some embodiments, models 201 may provide a measure of affinity, correlation, weight, likelihood, etc. of the association between model output labels 301 and input data 303.

Process 800 may also include receiving (at 808) the set of labels generated by the one or more models 201. For example, model explanation interface 203 may receive (e.g., via an API or other suitable pathway) the one or more model output labels 301 generated by model(s) 201.

Process 800 may further include generating (at 810) an image or other suitable type of visual representation based on the input data. For example, model explanation interface 203 may generate one or more charts, graphs, or other types of visual representations of the received input data 303. Process 800 may additionally include providing (at 812) the image or other suitable type of visual representation to explanation model 101. Additionally, or alternatively, model explanation interface 203 may provide input data 303 to explanation model 101, which may generate the image or other suitable type of visual representation based on input data 303.

Process 800 may also include receiving (at 814) a set of explanation labels provided by the explanation model based on the generated image or other suitable type of visual representation. For example, explanation model 101 may utilize image recognition techniques (e.g., such as computer vision or other suitable image recognition techniques) to identify one or more images (or sets of images) of the training data (e.g., as trained at 802) that match the image or other suitable type of visual representation that was generated (at 810) based on input data 303. The "match" may be determined using any suitable similarity analysis to identify the one or more images of the training data that exhibit at least a threshold measure of similarity to the image or other suitable type of visual representation associated with input data 303.

In some embodiments, explanation model 101 may identify particular portions of the image associated with input data 303 that match the one or more images of the training data. For example, the entire image associated with input data 303 may not match images of the training data, but a portion of the image associated with input data 303 may match one or more images of the training data. In some such scenarios, explanation model 101 may generate one or more bounding boxes or other annotations indicating which portion or portions of the image associated with input data 303 match the one or more images of the training data. Such a situation may occur, for example, when a network is exhibiting relatively "normal" or "expected" KPIs over a given timeframe, but experiences an anomaly, event, failure, etc. at a particular time. The image(s) of the training data may include images that reflect the same type of anomaly, event, etc., and may accordingly match a portion of the image associated with input data 303 that corresponds to the particular time. Such image(s) of the training data may, on the other hand, not match other portions of the same image associated with input data 303 (e.g., where such other portions correspond to times at which the "normal" or "expected" KPIs were exhibited).

Process 800 may further include outputting (at 816), in response to receiving the input data, the labels provided by the one or more models as well as the explanation labels provided by the explanation model. For example, as discussed above, model explanation interface 203 may output packaged output data 509, including explanation labels 505 generated by explanation model 101 and model output labels 507 generated by model(s) 201. In this manner, a user or other entity receiving packaged output data 509 may be able to readily identify reasoning or rationale behind the model output labels 507 generated by model(s) 201, and may be provided further insight as to potential anomalies, errors, etc. exhibited in input data 303. In this manner, weights and/or other measures of reliance on model(s) 201 may be adjusted (e.g., may be increased if the explanation labels are accurate, or decreased if the explanation labels are inaccurate). Further, networks or other systems based on which input data 303 is associated may further be refined, remediated, etc. based on the detailed explanations provided by explanation model 101.

Figure 9:
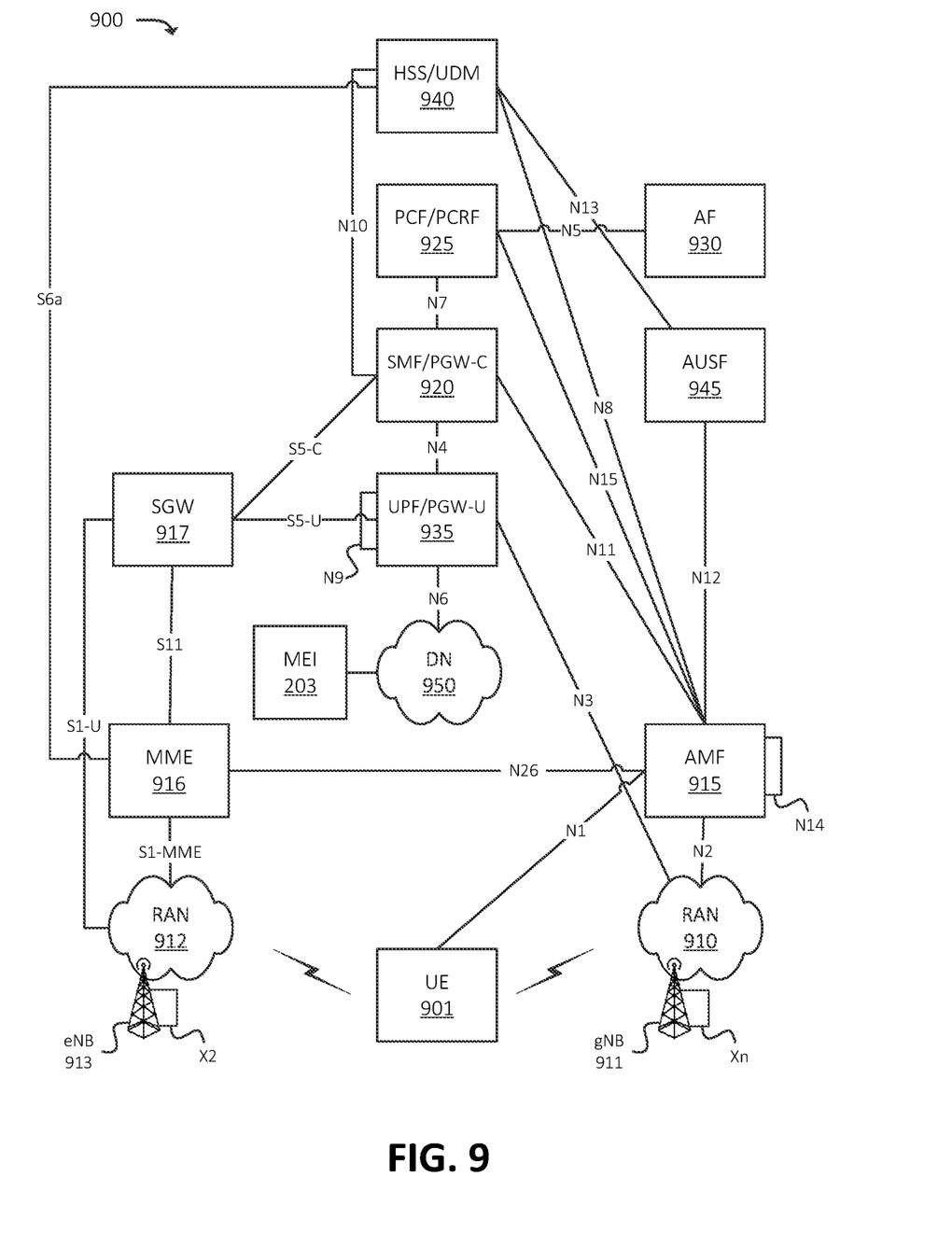
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 901, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Unified Data Management ("UDM")/Home Subscriber Server ("HSS") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as model explanation interface 203.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 901 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), Cloud-Native Network Functions ("CNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 901.

Model explanation interface 203 may include one or more devices, systems, servers, etc. that perform one or more operations described above. In some embodiments, model explanation interface 203 may be implemented by the same set of devices, systems, servers, etc. that implement one or more explanation models 101 and/or models 201. Additionally, or alternatively, model explanation interface 203 and one or more explanation models 101 and/or models 201 may be implemented by different devices, systems, servers, etc. In some embodiments, input data 303 may be associated with configuration parameters, KPIs, metrics, etc. associated with some or all of the elements of environment 900.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
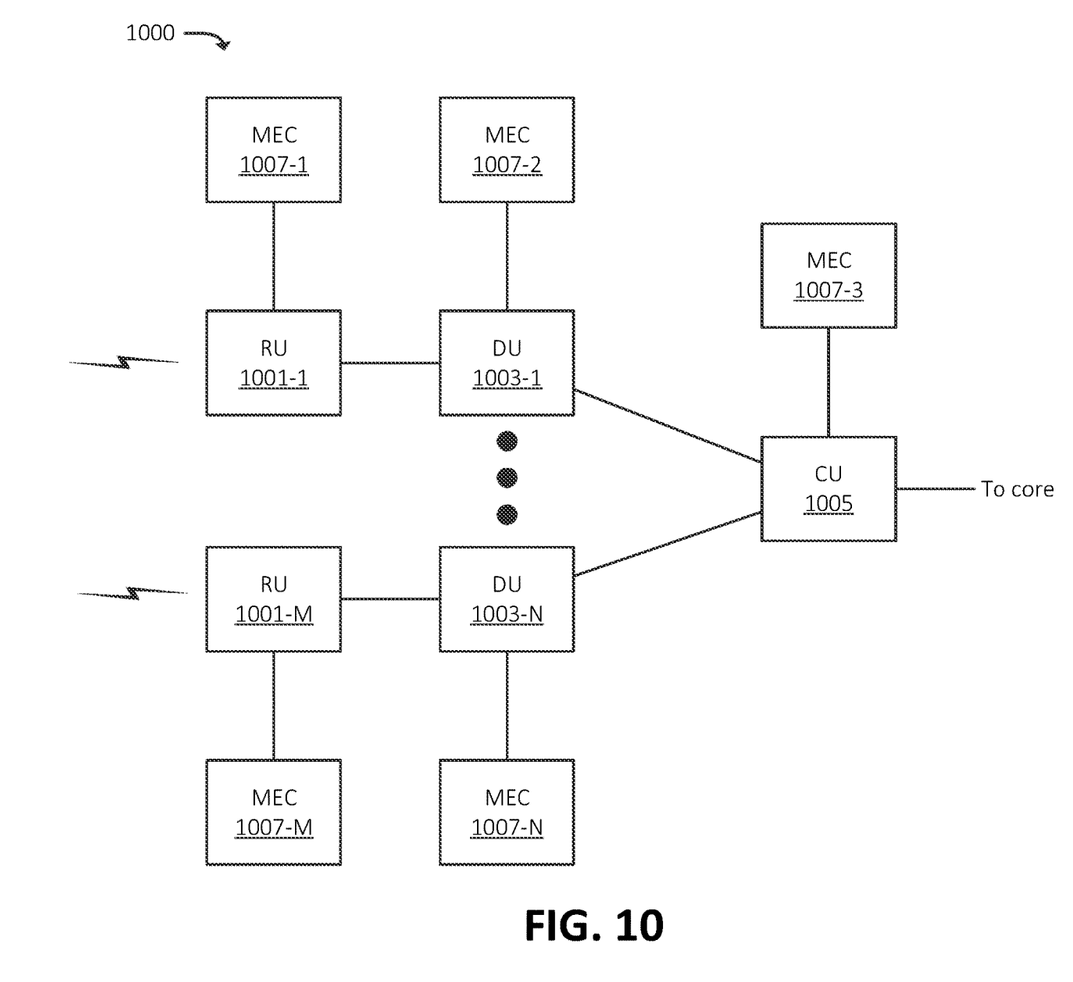
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to explanation model 101, model 201, model explanation interface 203, UPF 935, and/or one or more other devices, systems, VNFs, CNFs, etc.

Figure 11:
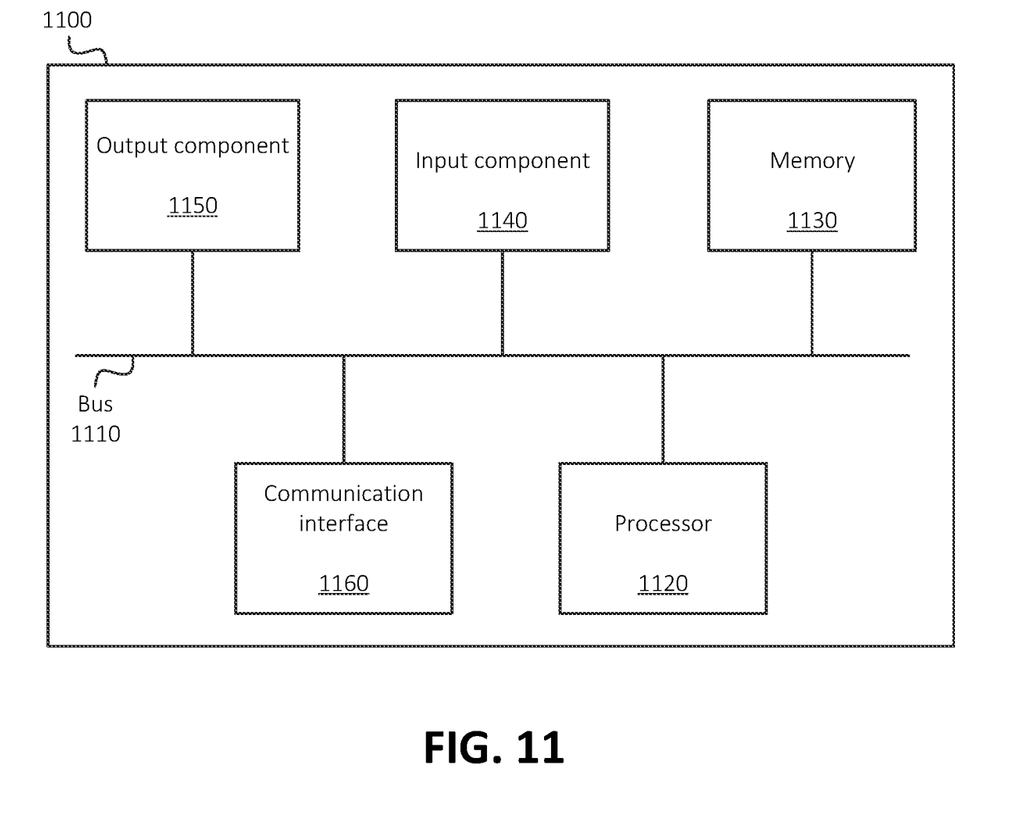
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
associate a plurality of images with a plurality of labels, wherein associating the plurality of images with the plurality of labels includes associating a particular set of images with a first set of labels;
provide a particular set of data as input to a model;
receive, as output from the model, a second set of labels determined by the model as being associated with the particular set of data;
generate a particular image based on the particular set of data provided to the model;
compare the particular image to the plurality of images;
determine, based on the comparing, that the particular image is associated with the particular set of images; and
output information associating the particular set of data with the first set of labels and the second set of labels based on the output from the model and further based on determining that the particular image is associated with the particular set of images.

2. The device of claim 1, wherein comparing the particular image to the plurality of images includes using one or more computer vision techniques.

3. The device of claim 1, wherein the model is a first model, wherein associating the plurality of images with the plurality of labels includes training a second model to associate the plurality of images with the plurality of labels, wherein the comparing is performed by the second model.

4. The device of claim 2, wherein the one or more processors are further configured to:
provide the particular image or the particular set of data as input to the second model; and
receive, as output from the second model, the first set of labels determined by the second model as being associated with the particular image or the particular set of data.

5. The device of claim 1, wherein the particular set of data includes a set of Key Performance Indicators ("KPIs") associated with a wireless network.

6. The device of claim 1, wherein the one or more processors are further configured to:
identify, based on the comparing, one or more portions of the particular image that are associated with at least a threshold measure of similarity with the particular set of images,
wherein determining that the particular image is associated with the particular set of images is based on identifying the one or more portions of the particular image that are associated with at least the threshold measure of similarity with the particular set of images,
wherein outputting the information associating the particular set of data with the first set of labels and the second set of labels includes outputting an indication of the identified one or more portions of the particular image.

7. The device of claim 6, wherein the indication of the one or more portions of the particular image include one or more bounding boxes overlaid on the particular image.

8. A non-transitory computer-readable medium, storing a plurality of processor-executable instructions to:
associate a plurality of images with a plurality of labels, wherein associating the plurality of images with the plurality of labels includes associating a particular set of images with a first set of labels;
provide a particular set of data as input to a model;
receive, as output from the model, a second set of labels determined by the model as being associated with the particular set of data;
generate a particular image based on the particular set of data provided to the model;
compare the particular image to the plurality of images;
determine, based on the comparing, that the particular image is associated with the particular set of images; and
output information associating the particular set of data with the first set of labels and the second set of labels based on the output from the model and further based on determining that the particular image is associated with the particular set of images.

9. The non-transitory computer-readable medium of claim 8, wherein comparing the particular image to the plurality of images includes using one or more computer vision techniques.

10. The non-transitory computer-readable medium of claim 8, wherein the model is a first model, wherein associating the plurality of images with the plurality of labels includes training a second model to associate the plurality of images with the plurality of labels, wherein the comparing is performed by the second model.

11. The non-transitory computer-readable medium of claim 10, wherein the plurality of processor-executable instructions further include processor-executable instructions to:
provide the particular image or the particular set of data as input to the second model; and
receive, as output from the second model, the first set of labels determined by the second model as being associated with the particular image or the particular set of data.

12. The non-transitory computer-readable medium of claim 8, wherein the particular set of data includes a set of Key Performance Indicators ("KPIs") associated with a wireless network.

13. The non-transitory computer-readable medium of claim 8, wherein the plurality of processor-executable instructions further include processor-executable instructions to:
identify, based on the comparing, one or more portions of the particular image that are associated with at least a threshold measure of similarity with the particular set of images,
wherein determining that the particular image is associated with the particular set of images is based on identifying the one or more portions of the particular image that are associated with at least the threshold measure of similarity with the particular set of images,
wherein outputting the information associating the particular set of data with the first set of labels and the second set of labels includes outputting an indication of the identified one or more portions of the particular image.

14. The non-transitory computer-readable medium of claim 13, wherein the indication of the one or more portions of the particular image include one or more bounding boxes overlaid on the particular image.

15. A method, comprising:
associating a plurality of images with a plurality of labels, wherein associating the plurality of images with the plurality of labels includes associating a particular set of images with a first set of labels;
providing a particular set of data as input to a model;
receiving, as output from the model, a second set of labels determined by the model as being associated with the particular set of data;
generating a particular image based on the particular set of data provided to the model;
comparing the particular image to the plurality of images;
determining, based on the comparing, that the particular image is associated with the particular set of images; and
outputting information associating the particular set of data with the first set of labels and the second set of labels based on the output from the model and further based on determining that the particular image is associated with the particular set of images.

16. The method of claim 15, wherein comparing the particular image to the plurality of images includes using one or more computer vision techniques.

17. The method of claim 15, wherein the model is a first model, wherein associating the plurality of images with the plurality of labels includes training a second model to associate the plurality of images with the plurality of labels, wherein the comparing is performed by the second model, wherein the method further comprises:
providing the particular image or the particular set of data as input to the second model; and
receiving, as output from the second model, the first set of labels determined by the second model as being associated with the particular image or the particular set of data.

18. The method of claim 15, wherein the particular set of data includes a set of Key Performance Indicators ("KPIs") associated with a wireless network.

19. The method of claim 15, further comprising:
identifying, based on the comparing, one or more portions of the particular image that are associated with at least a threshold measure of similarity with the particular set of images,
wherein determining that the particular image is associated with the particular set of images is based on identifying the one or more portions of the particular image that are associated with at least the threshold measure of similarity with the particular set of images,
wherein outputting the information associating the particular set of data with the first set of labels and the second set of labels includes outputting an indication of the identified one or more portions of the particular image.

20. The method of claim 19, wherein the indication of the one or more portions of the particular image include one or more bounding boxes overlaid on the particular image.

* * * * *